Figure 4:
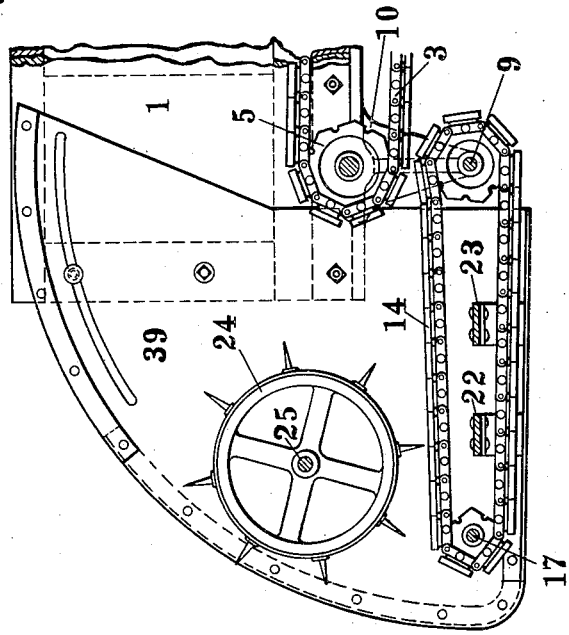

W. C. JIRDINSTON.
MANURE SPREADER.
APPLICATION FILED JAN. 27, 1913.
1,218,866.
Patented Mar. 13, 1917.
3 SHEETS—SHEET 1.
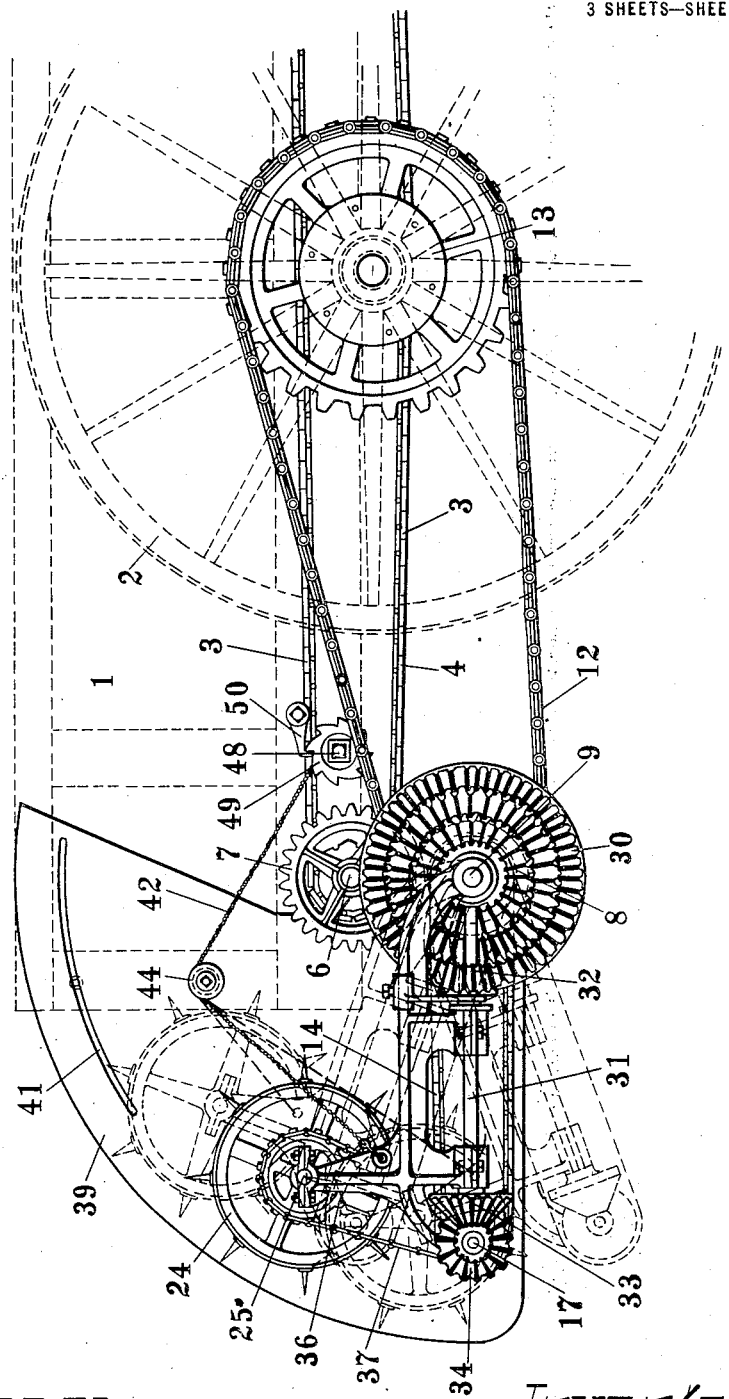

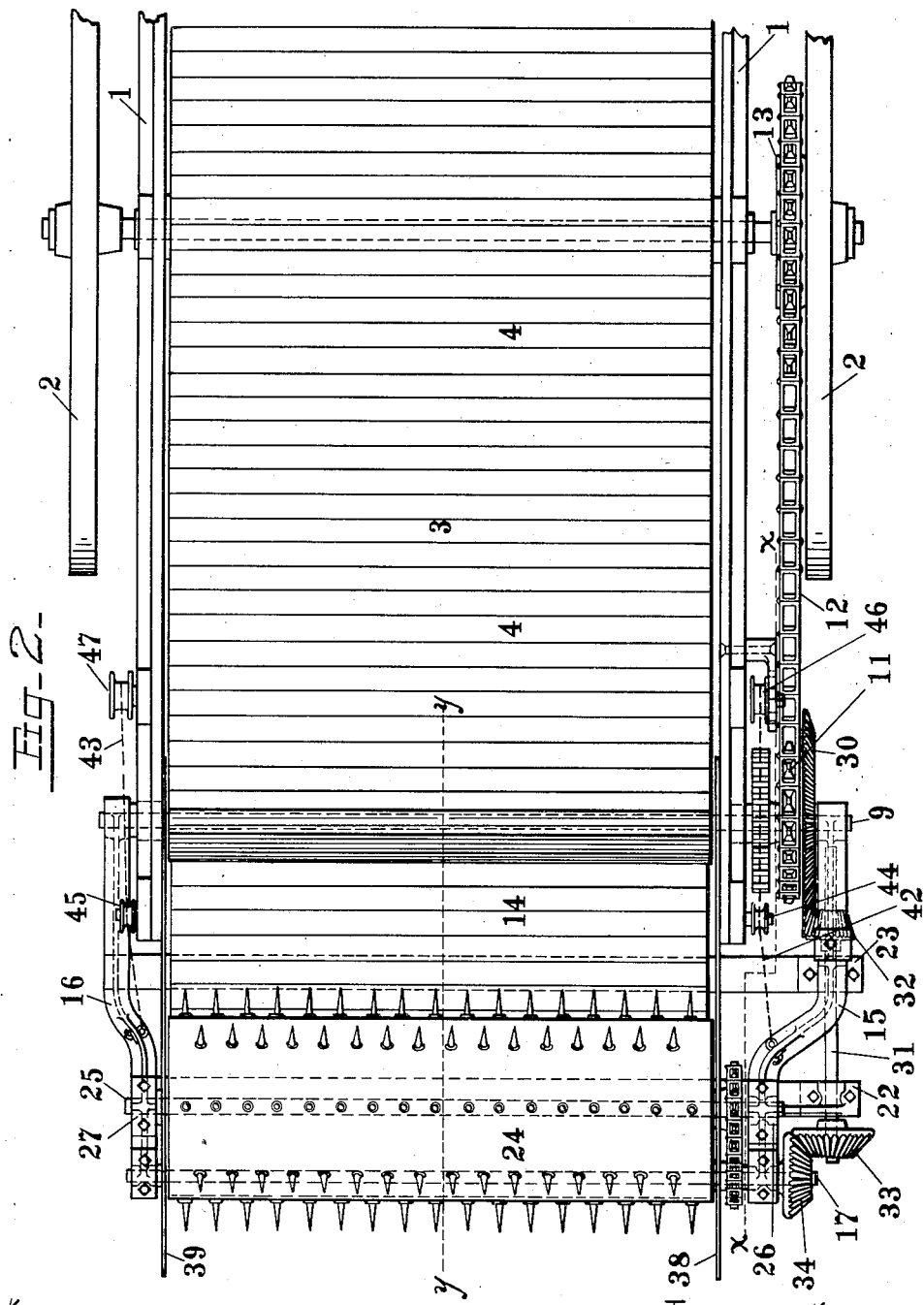

W. C. JIRDINSTON.
MANURE SPREADER.
APPLICATION FILED JAN. 27, 1913.

1,218,866.

Patented Mar. 13, 1917.
3 SHEETS—SHEET 3.

Witnesses:
Frances S Jirdinston
Frances Young

Inventor:
William C. Jirdinston

UNITED STATES PATENT OFFICE.

WILLIAM C. JIRDINSTON, OF MOLINE, ILLINOIS, ASSIGNOR TO MARSEILLES COMPANY, OF EAST MOLINE, ILLINOIS, A CORPORATION OF ILLINOIS.

MANURE-SPREADER.

1,218,866. Specification of Letters Patent. Patented Mar. 13, 1917.

Application filed January 27, 1913. Serial No. 744,423.

*To all whom it may concern:*

Be it known that I, WILLIAM C. JIRDINSTON, a citizen of the United States, residing at Moline, in the county of Rock Island and State of Illinois, have invented new and useful Improvements in Manure-Spreaders, of which the following is a specification.

My invention relates to improvements in mechanism for spreading manure, or similar material; and an object of my improvement is to loosen, as much as possible, the manure before it is acted upon by the distributing means. Other objects of my invention will be described more fully hereinafter.

Figure 3:
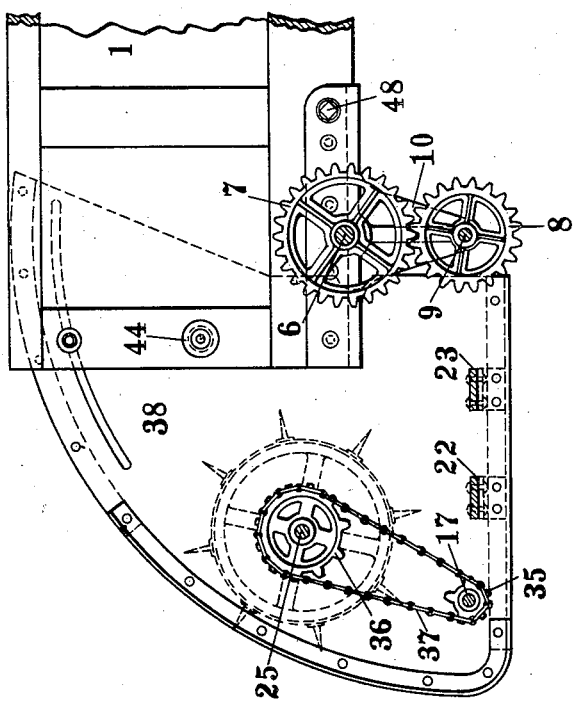

Referring to the drawings in which similar numerals indicate identical parts in the various figures:

Figure 1 is an enlarged view of the rear end of a manure spreader showing my improvement, and the box and rear-wheels in dotted lines. Fig. 2 is a plan view of Fig. 1. Fig. 3 is a section on the line *x—x* of Fig. 2. Fig. 4 is a section on the line *y—y* of Fig. 2.

The box-shaped body 1 is mounted on wheels as usual, the operating power of the spreading mechanism being derived from the rear-wheels 2. Forming the bottom of the body 1 is a conveyer 3, and consisting preferably of slats 4 secured to a chain passing around one or more sprockets 5 and adapted to deliver the manure rearwardly toward the distributer.

The sprockets 5 are mounted on a shaft 6 journaled in suitable bearings on the box 1; a gear 7 engages with a similar gear 8 rigid on a shaft 9 which is also journaled in suitable bearings 10 on the bottom of the box 1. A sprocket 11 is also rigidly mounted on the shaft 9 to which motion is imparted through a chain 12 passing around a sprocket 13 on one of the rear wheels 2, so that as the machine advances the apron is operated to move the load rearwardly.

When the machine is loaded the manure is generally in a compacted condition, which is increased by the motion of the machine while transporting the load from the place of loading to the place of distribution; it is very desirable that this compacted state be destroyed, as far as possible, and the manure be loosened and broken before it is scattered by the distributer, and for this purpose I have provided an auxiliary conveyer 14 rearwardly of the main conveyer 3, acting between the latter and the distributer, and which I will now describe.

Pivotally mounted on the shaft 9, and extending rearwardly are brackets 15 and 16, having suitably journaled thereon rearwardly a shaft 17, over which the auxiliary conveyer 14 travels, the latter being preferably constructed similar to the main conveyer 3, and movable in a similar manner by means of sprockets on the shafts 9 and 17. Bars 22 and 23 rigidly connect the brackets 15 and 16. A distributer 24, comprising a drum having teeth, is secured on a shaft 25 journaled in bearings 26 and 27 on supports and which may be integral with the brackets 15 and 16, or secured thereon in any suitable manner.

To impart motion to the auxiliary conveyer 14 and the distributer 24, I employ a disk 30 which is rigidly mounted on the shaft 9; a shaft 31 is journaled in bearings on the bracket 15 and carries thereon a bevel pinion 32. On the rear of the shaft 31 is rigidly secured a bevel pinion 33 meshing with a similar pinion 34 on the shaft 17, and transmitting motion to the auxiliary conveyer 14; a sprocket 35 is rigidly mounted on the shaft 17, with which it revolves, and which is connected to a similar sprocket 36 on the shaft 25 by a chain 37 revolving the distributer to carry the manure up and over to the rear.

To prevent loss of manure over the sides of the auxiliary conveyer 14 when the latter is in operation, I provide shields 38 and 39 secured to the auxiliary conveyer frame, and adjustable with it, and projecting into the rear of the box 1, with which they are in close contact, and held against lateral movement by bolts on the box 1 operating in slots 40 and 41.

The auxiliary conveyer 14 is mounted and operates in a plane lower than the plane of the main conveyer 3, and its rear is adjustable above or below a horizontal plane, or its normal position of parallelism with the main conveyer 3, by means of chains or cables 42 and 43 secured to the brackets 15 and 16, and leading over idle pulleys 44 and 45 on the sides of the box 1 to drums 46 and 47 on a shaft 48 which is mounted in suitable bearings on the box 1; an ordinary hand crank is used to operate the shaft 48, which has a ratchet 49 thereon, and with which a dog 50 engages to retain the auxiliary conveyer in any position of adjustment.

The auxiliary conveyer 14 may be operated at the same speed as the main conveyer or at a greater or lesser speed as may be desired, and while I have shown one way of operating my improvement, I do not limit myself thereby, as it is obvious that other arrangements of gearing will accomplish the same purpose.

As the manure is carried rearward by the main conveyer 3 and reaches the end thereof, it drops abruptly to the auxiliary conveyer 41 which tends to loosen and spread the manure before it reaches the distributer 24, and if the auxiliary conveyer is moved at a greater speed than the main conveyer the manure will be still further loosened, while a slower speed to the auxiliary conveyer will tend to present the manure to the distributer in greater volume. Similar effects are obtained by adjusting the rear of the auxiliary conveyer, as shown in dotted lines Fig. 1, if given a downward inclination the effect upon the manure will be to loosen it, an effect that will be materially aided by increasing the speed of the auxiliary conveyer above the speed of the main conveyer, but such an increase diminishes the volume of manure presented to the distributer; a decided advantage is obtained, however, in operating the auxiliary conveyer with a downward inclination, as the distribution of the manure occurs closer to the ground than can be obtained otherwise, resulting in a more even spread, the quantity of manure distributed depending upon regulation of the speed of the auxiliary conveyer; when the auxiliary conveyer is adjusted to an upward inclination, however, an increased speed is desirable.

Means upon the rear of the box 1 to hold the manure therein during loading or transportation, and means for throwing the conveying and distributing mechanism out of operation are commonly employed, but I have not shown or described such, as various types may be used without, in any way, affecting or altering the scope of my invention, which I do not limit to the details of the construction shown and described.

What I claim is—

1. In a manure spreader, the combination of a box body having a conveyer bottom, an auxiliary conveyer rearward of the conveyer bottom and below the plane thereof, a distributer adapted to lift material from the auxiliary conveyer and carry it upward and rearward over the distributer to the ground, and means to operate the conveyer bottom and the distributer.

2. In a manure spreader, the combination of a box body having a conveyer bottom, an auxiliary conveyer rearward of the conveyer bottom and below the plane thereof, a distributer supported above the rear of the auxiliary conveyer and adapted to lift material therefrom and carry it upward and rearward over the distributer to the ground, and means to actuate the conveyer bottom, the auxiliary conveyer and the distributer.

3. In a manure spreader, the combination of a box body having a conveyer bottom, an auxiliary conveyer extending forwardly and beneath the rear of the conveyer bottom and pivotally supported in fixed relation thereto, a distributer supported above the rear of the auxiliary conveyer and adapted to lift material therefrom and carry it upward and rearward over the distributer to the ground, and means to actuate the conveyer bottom, the auxiliary conveyer and the distributer.

4. In a manure spreader having a bottom conveyer and a distributer, an auxiliary conveyer between the bottom conveyer and the distributer, the distributer and the rearward end of the auxiliary conveyer being vertically adjustable simultaneously, and means to operate both conveyers and the distributer.

5. In a manure spreader having a main conveyer, an adjustable auxiliary conveyer supported beneath the rear of the main conveyer and extending rearwardly, a distributer above the rear of the auxiliary conveyer and adapted to lift material therefrom to carry it upward and rearward over the distributer to the ground, means to vertically adjust the auxiliary conveyer and the distributer simultaneously, and means to actuate the conveyers and the distributer.

6. In a manure spreader having a conveyer bottom and a distributer, a rearwardly operating auxiliary conveyer between the conveyer bottom and the distributer, means to operate both conveyers and the distributer, and means to adjust the rear end of the auxiliary conveyer above or below the plane of the conveyer bottom.

7. In a manure spreader having a box body and a conveyer bottom, an auxiliary conveyer operating to carry material from the conveyer bottom rearwardly, a distributer located above the rear of the auxiliary conveyer and adapted to lift material therefrom and carry it upward and rearward over the distributer to the ground, and shields on both sides of the auxiliary conveyer and extending above the distributer, said shields projecting forwardly of the rear of the box body and in close movable contact with the sides thereof.

8. In a manure spreader having a box body and a conveyer bottom, an auxiliary conveyer operating to carry material from the conveyer bottom rearwardly, a distributer located above the rear of the auxiliary conveyer and adapted to lift material therefrom and carry it upward and rearward over the distributer to the ground, and shields on both sides of the auxiliary conveyer and extending above the distributer, said shields projecting forwardly within the box body, and in close movable contact therewith.

9. In a manure spreader having a box body and a conveyer bottom, a shaft about which the conveyer bottom moves, a second shaft journaled below the conveyer bottom shaft and having rearwardly extending brackets supported thereon, a shaft journaled on the brackets, an auxiliary conveyer movable with the latter shaft and the second shaft, and means to move all of said shafts simultaneously.

10. In a manure spreader having a box body, a conveyer bottom in the box body, a shaft about which the conveyer bottom moves, a second shaft journaled below the conveyer bottom shaft and connected therewith and having rearwardly extending brackets supported thereon, a shaft journaled on the brackets, an auxiliary conveyer movable with the latter shaft and the second shaft, and means connecting said second shaft with a source of power to move all of said shafts simultaneously.

11. In a manure spreader having a box body and supporting wheels therefor, a conveyer bottom in the box body, a shaft about which the conveyer bottom moves, a second shaft journaled below the conveyer bottom shaft and connected therewith, and having rearwardly extending brackets supported thereon, a distributer supported on the brackets, a shaft journaled on the brackets and connecting with the distributer, an auxiliary conveyer movable with the latter shaft and the second shaft, and means connecting said second shaft and supporting wheels to move all of said shafts and the distributer simultaneously.

12. In a manure spreader, having a box body and supporting wheels therefor, a conveyer bottom in the box body, a shaft about which the conveyer bottom moves, a gear upon said shaft, a second shaft journaled below the conveyer bottom shaft and having a gear thereon to mesh with the gear on the conveyer bottom shaft, brackets supported on the second shaft and having a shaft journaled rearwardly thereon, an auxiliary conveyer movable about the latter shaft and the second shaft, means connecting the shafts about which the auxiliary conveyer moves, a distributer mounted on the bracket, means connecting the distributer and the shaft on the brackets, and a sprocket on one of the supporting wheels connecting with a sprocket on the second shaft to operate the conveyers and the distributer simultaneously.

In testimony whereof I affix my signature, in presence of two witnesses.

WILLIAM C. JIRDINSTON.

Witnesses:
   Frances S. Jirdinston,
   Frances Young.